United States Patent
Birman et al.

(10) Patent No.: US 9,720,250 B1
(45) Date of Patent: Aug. 1, 2017

(54) TUNABLE OPTICAL FILTER WITH ADJUSTABLE BANDWIDTH

(71) Applicant: DICON FIBEROPTICS, INC., Richmond, CA (US)

(72) Inventors: Alexander Jacob Birman, Oakland, CA (US); Ying-Yu Su, Kaohsiung (TW); Ho-Shang Lee, El Sobrante, CA (US)

(73) Assignee: DICON FIBEROBTICS, INC., Richmond, CA (US)

( * ) Notice: Subject to any disclaimer, the term of this patent is extended or adjusted under 35 U.S.C. 154(b) by 0 days.

(21) Appl. No.: 15/139,694

(22) Filed: Apr. 27, 2016

Related U.S. Application Data (60) Provisional application No. 62/318,696, filed on Apr. 5, 2016.

(51) Int. Cl.
| | |
|---|---|
| G02B 6/26 | (2006.01) |
| G02B 27/42 | (2006.01) |
| G02B 6/293 | (2006.01) |
| G02B 6/32 | (2006.01) |

(52) U.S. Cl.
CPC ....... *G02B 27/4244* (2013.01); *G02B 6/2931* (2013.01); *G02B 6/29313* (2013.01); *G02B 6/29389* (2013.01); *G02B 6/29395* (2013.01); *G02B 6/32* (2013.01); *G02B 27/4277* (2013.01)

(58) Field of Classification Search
None
See application file for complete search history.

(56) References Cited

U.S. PATENT DOCUMENTS

| | | | |
|---|---|---|---|
| 4,287,486 A * | 9/1981 | Javan | H01S 3/07 372/100 |
| 6,204,946 B1 | 3/2001 | Aksyuk et al. | |
| 6,628,856 B1 | 9/2003 | Costello et al. | |
| 6,782,153 B2 | 8/2004 | Polinsky et al. | |
| 6,791,694 B2 | 9/2004 | Pezeshki | |
| 7,085,492 B2 | 8/2006 | Ibsen et al. | |
| 7,321,704 B2 | 1/2008 | Ducellier et al. | |
| 7,899,330 B2 | 3/2011 | Ye et al. | |
| 2002/0039231 A1* | 4/2002 | Sela | G02B 5/1814 359/566 |
| 2002/0122256 A1* | 9/2002 | Mitamura | G02B 6/2931 359/577 |

(Continued)

OTHER PUBLICATIONS

Buchwald, "Fused Silica Transmittal Gratings." White Paper. Ibsen Photonics. Version 1.0. 22 pages. Mar. 2007.

(Continued)

*Primary Examiner* — Mike Stahl
(74) *Attorney, Agent, or Firm* — Vierra Magen Marcus LLP (57) ABSTRACT

A tunable optical filter utilizes a pair of diffraction gratings and a rotating mirror to achieve a broad filter passband or wavelength bandwidth. By adjusting a small angle between the two diffraction gratings, such as less than approximately 15 degrees, the wavelength bandwidth of the tunable optical filter's passband may be arbitrarily adjusted or set. The two-grating system results in a narrower angular dispersion coefficient than could be achieved through the use of a single grating with similar properties. The narrower angular dispersion in turn results in a broader filter passband or wavelength bandwidth.

25 Claims, 7 Drawing Sheets

(56) References Cited

U.S. PATENT DOCUMENTS

| | | |
|---|---|---|
| 2004/0136074 A1 | 7/2004 | Ford et al. |
| 2004/0252938 A1 | 12/2004 | Ducellier et al. |
| 2005/0074204 A1 | 4/2005 | Wilson et al. |
| 2005/0213978 A1 | 9/2005 | Yamashita et al. |
| 2006/0098981 A1 | 5/2006 | Miura et al. |
| 2006/0222290 A1* | 10/2006 | Yamashita ............ G02B 6/3586 385/18 |
| 2008/0085119 A1 | 4/2008 | Ye et al. |
| 2012/0033213 A1* | 2/2012 | Yang ..................... G01J 3/02 356/326 |
| 2012/0147908 A1* | 6/2012 | Simanovski ............ H01S 3/067 372/6 |
| 2015/0346480 A1* | 12/2015 | Chen ................. G02B 26/002 359/226.1 |

OTHER PUBLICATIONS

Wilson et al., "Spectral Filter with Independently Variable Center Wavelength and Bandwidth." IEEE Photonics Technology Letters, 18(15):1660-1662. Aug. 1, 2006. First disclosed at ECOC 2004, Aug. 2004.

* cited by examiner

TUNABLE OPTICAL FILTER WITH ADJUSTABLE BANDWIDTH

CROSS-REFERENCE TO RELATED APPLICATIONS

This application claims priority from, U.S. Provisional Application No. 62/318,696 filed on Apr. 5, 2016, which is hereby incorporated in its entirety by this reference.

BACKGROUND

The following relates generally to the optical components used in optical communication networks, and specifically to an optical device that can filter optical signals, with an adjustable bandpass, or filter characteristic.

Optical amplifiers are extensively used in fiber optic networks in order to compensate for the attenuation loss of the optical signal while traveling along fibers and passing through other optical components. Amongst a few types of optical amplifiers, the erbium-doped fiber amplifier is widely deployed in worldwide fiberoptic networks, as a result of its strong optical gain and excellent performance in the operating wavelength range (1530 to 1570 nm) of typical optical networks.

Figure 1A:
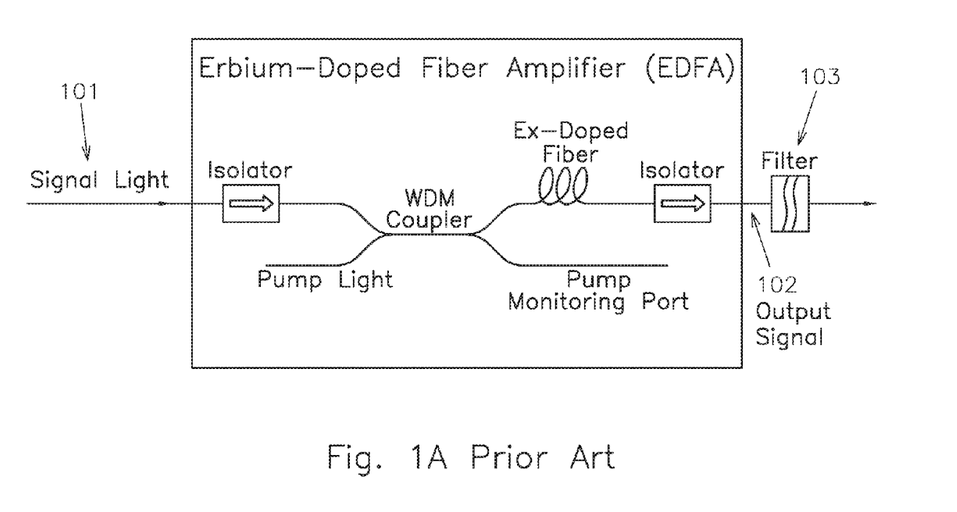
FIG. 1A illustrates a prior art Erbium-Doped Fiber Amplifier (EDFA), used to amplify an optical signal.
Figure 1B:
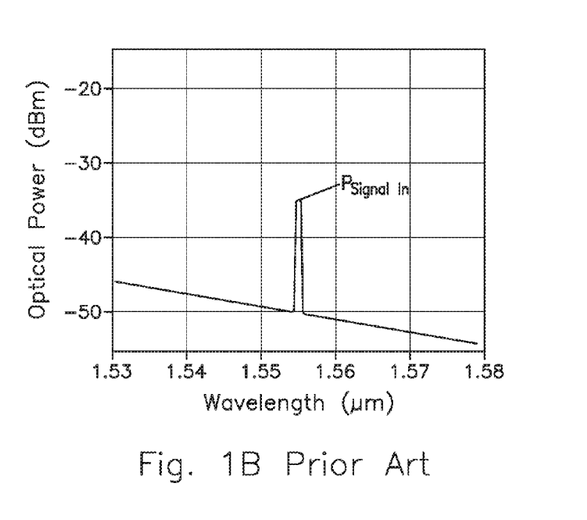
FIG. 1B illustrates a typical optical signal, at the input of the prior art EDFA.
Figure 1C:
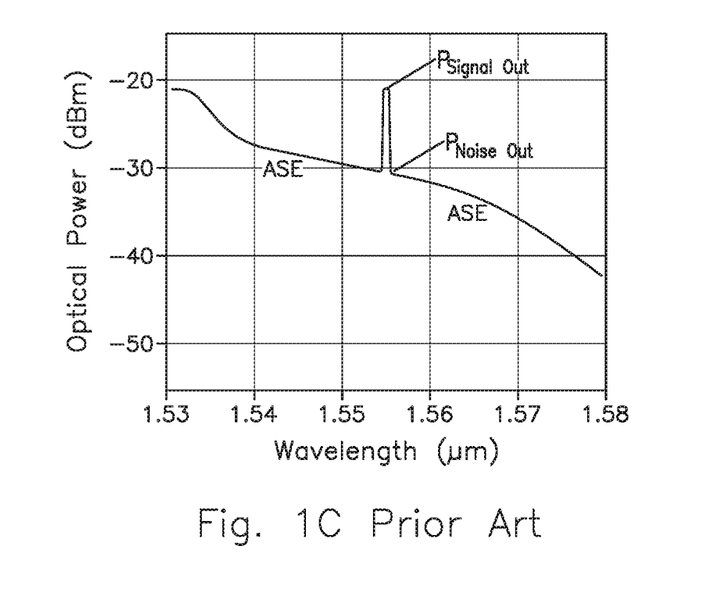
FIG. 1C illustrates the optical signal at the output of the prior art EDFA, showing the impact of Amplified Spontaneous Emission (ASE) noise.
Figure 1D:
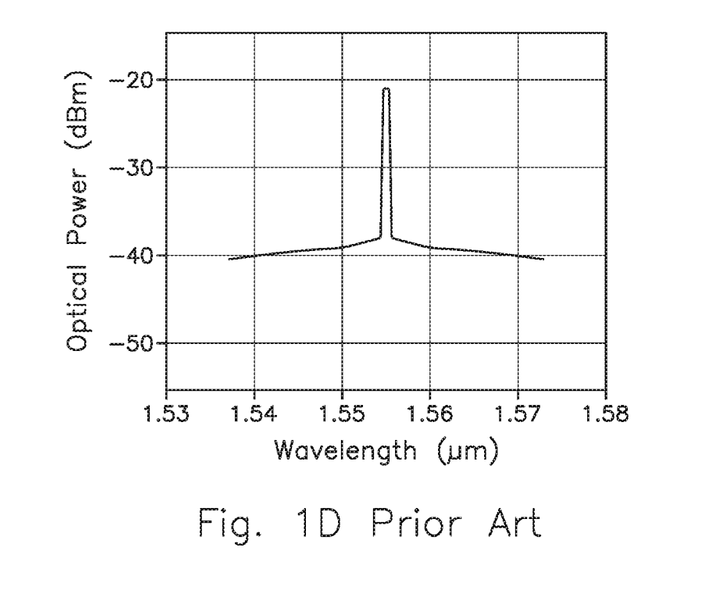
FIG. 1D illustrates the effect of filtering the output optical signal, to remove ASE noise.

FIG. 1A exemplifies a representative Erbium-Doped Fiber Amplifier (EDFA) of the prior art. The optical signals at various points within FIG. 1A are depicted in FIGS. 1B, 1C, and 1D. An input optical signal 101, having an optical power spectrum as indicated in FIG. 1B, enters an EDFA and is optically boosted by stimulated emission within the erbium-doped fiber to become a stronger output signal 102, having a power spectrum as shown in FIG. 1C. However, Amplified Spontaneous Emission (commonly referred to as ASE) occurs simultaneously with the stimulated emission. This results in an unacceptable level of noise that is present with the intended output signal. Therefore a wavelength filter 103 in FIG. 1A is used to filter out the unwanted ASE noise, as shown in FIG. 1D, before the signal continues to propagate down the fiber, or is sent to a photo-detector or optical receiver. By filtering out much of the ASE noise, the wavelength filter 103 improves the signal-to-noise ratio of the optical signal.

In modern intelligent or re-configurable optical networks, the wavelength of the input optical signal may be changed from time to time. For example, a tunable optical transmitter may be used to generate the input optical signal. Thus, a tunable optical filter 103 may need to respond to the incoming wavelength change. Furthermore, the optical signal power is modulated to carry the desired information. The higher the modulation rate, the wider the bandwidth of the optical signal or wavelength. As an example, the modulation rate of present advanced optical communication systems can go up to 400 Gbits/second. This creates a Full-Width-Half-Maximum (FWHM) wavelength bandwidth of about 1.3 nanometers. In order to prevent distortion of the filtered optical signal, the FWHM bandwidth of the filter is typically 3 to 5 times that of the signal. Thus a tunable optical filter with a FWHM bandwidth of 3 nm to 8 nm is useful.

SUMMARY

A tunable optical filter device includes first and second diffraction elements, a reflector, and an actuator. The first diffraction element is oriented to differentially diffract light of different wavelengths of an incident beam of light from an input port. The second diffraction element is oriented to differentially diffract light of different wavelengths of the beam of light incident upon it from the first diffraction element. The second diffraction element is oriented relative to the first diffraction element such that the cumulative amount of angular dispersion from the first and second diffraction elements for portions of the beam of light incident upon the second diffraction element is less than the amount of angular dispersion from the first diffraction element for the portions of the beam of light incident upon the second diffraction element. The reflector reflects the portions of the beam of light incident upon it by the second diffraction element in an optical path between the input port and an output port. The actuator is connected to change the position of the reflector so that a selected range of wavelengths of the portion of the beam of light incident upon the reflector is reflected along the optical path from the input port to the output port.

A method includes receiving a beam of light at an input port and directing the beam of light to be incident on a first diffraction element. Light of different wavelengths of the beam of light from the input port that is incident on a first diffraction element is differentially diffracted by the first diffraction element. A second diffraction element differentially diffracts light of different wavelengths of the beam of light from the first diffraction element that is incident on the second diffraction element. The second diffraction element is oriented relative to the first diffraction element such that the cumulative amount of angular dispersion from the first and second diffraction elements for portions of the beam of light incident upon the second diffraction element is less than the amount of angular dispersion from the first diffraction element for the portions of the beam of light incident upon the second diffraction element. A reflector is positioned so that a selected range of wavelengths of a portion of the beam of light incident upon the reflector from the second diffraction element is reflected along an optical path from the input port to an output port.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

A diffraction grating is an optical component that can split or disperse a beam having multiple wavelengths, into individual wavelength components at different angles. The angular dispersion of the different wavelengths is typically achieved using a periodic structure, such as an array of grooves on the surface of an optical substrate.

Figure 2:
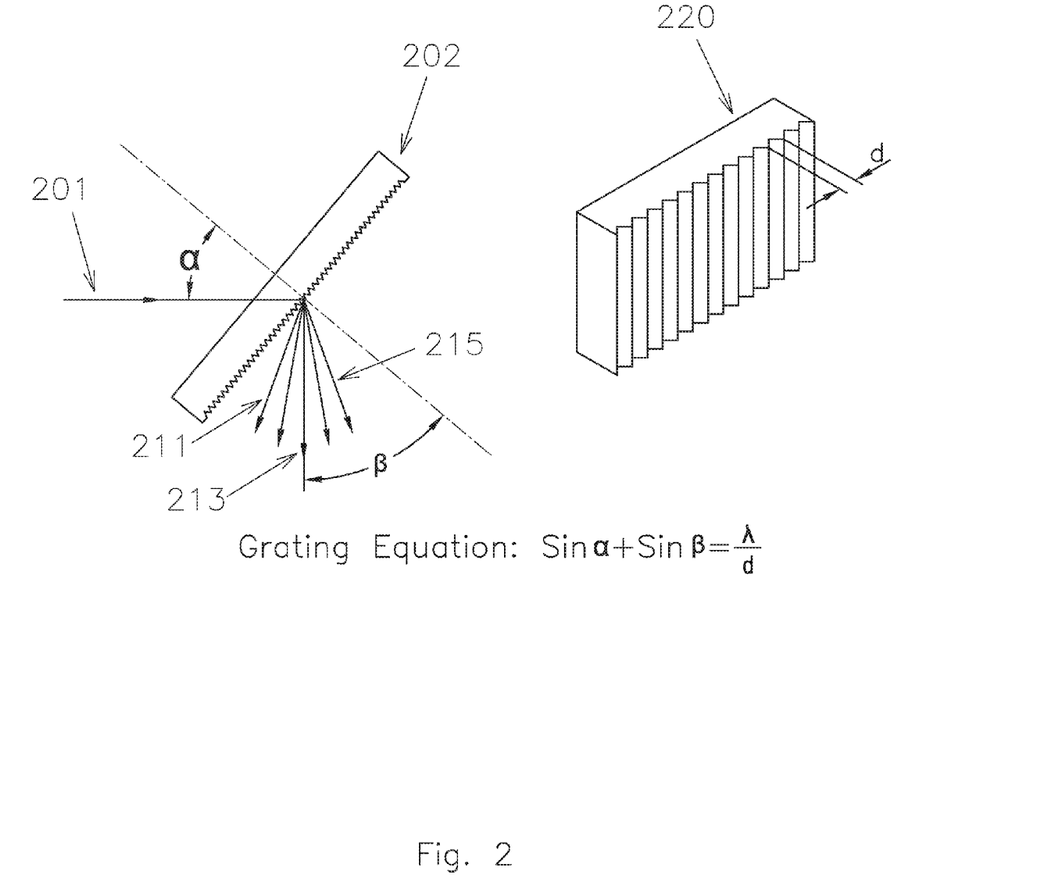
FIG. 2 illustrates the principles of operation of a diffraction grating.

As illustrated in FIG. 2, an incoming beam 201 carrying multiple wavelengths is incident on a diffraction grating 202, whose perspective view is shown as item 220. The beam is therefore bent and split into multiple wavelength components at different angles. The longer the wavelength, the larger the bending angle. Ray 211 has a longer wavelength than that of Ray 215. Ray 213 represents a ray around the middle of the angularly dispersed spectrum. The relationship between the exiting angle β and incident angle α follows the grating equation:

$$\sin \alpha + \sin \beta = \lambda/d \quad \lambda\text{:wavelength } d\text{:groove distance}$$

Thus, $\beta = \sin^{-1}(\lambda/d - \sin \alpha)$.

The dispersion coefficient D is thus defined by $$D = D(\lambda, d, \alpha) = d\beta/d\lambda \text{ (the differential of the exiting angle with respect to wavelength).}$$

Generally d is on the order of the wavelength λ. The smaller the groove distance d is, the more the dispersion ability. Conversely, the dispersion coefficient decreases with larger groove distance. For smaller or reduced wavelength dispersion, the groove distance d has to be increased. However, when the groove distance d becomes as large as a few multiples of the wavelength, the optical loss resulted from the grating becomes quite polarization dependent, which impairs the optical performance of devices that are built using diffraction gratings. For this and other reasons, a typical grating that is designed for operation in a wavelength range around 1550 nm will have a groove distance d of about 1 micron, and its dispersion coefficient is therefore around 0.08 degrees/nanometer.

Figure 3:
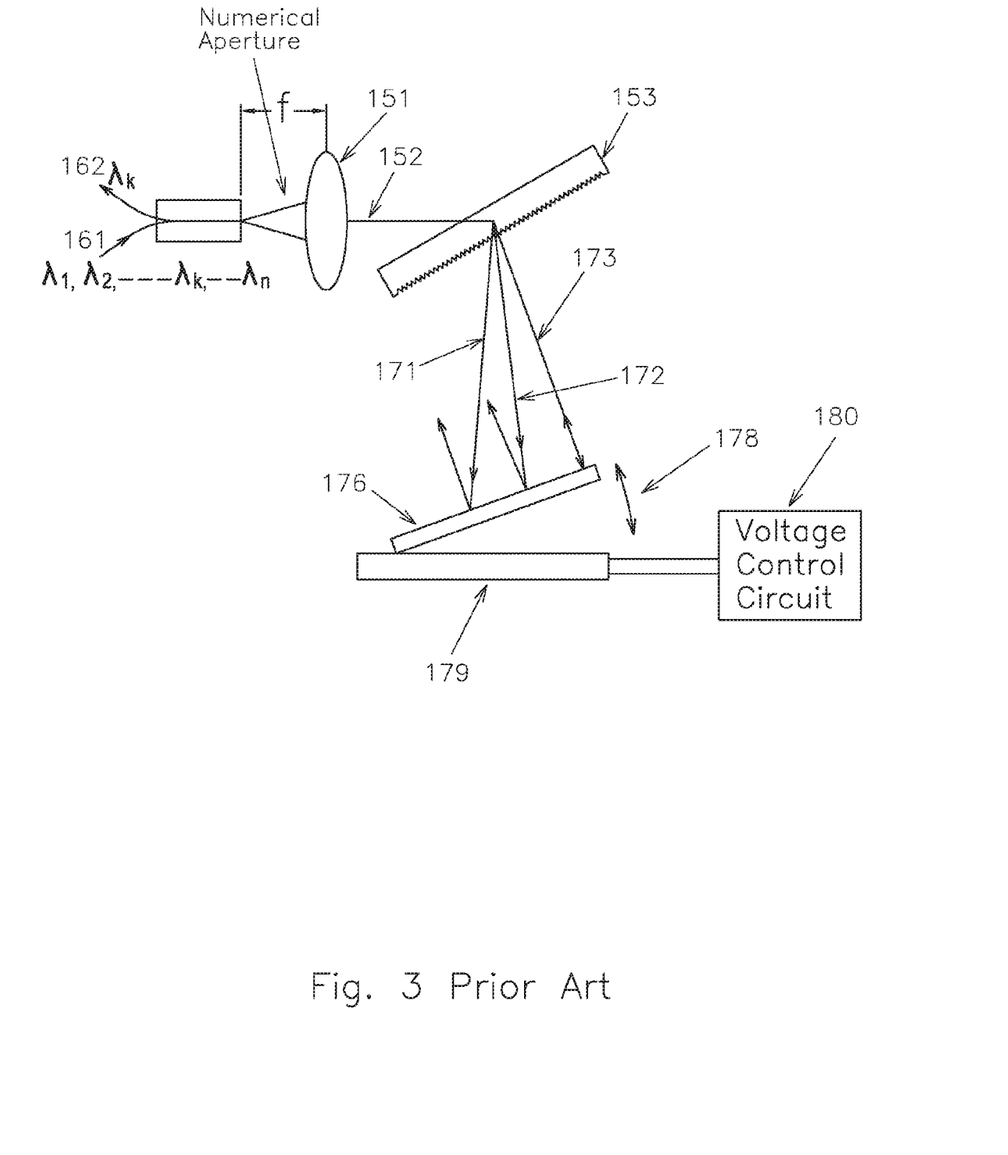
FIG. 3 shows a prior art embodiment of a tunable optical filter, using a diffraction grating and a rotating or tilting mirror.

FIG. 3 illustrates a prior art embodiment of a tunable filter, employing a grating and a rotating or tilting mirror (refer to U.S. Pat. No. 7,899,330 for more detail). An input fiber 161 carrying multiple wavelengths exits its fiber end face and then spreads out in an optical cone, based on the numerical aperture (NA) of the fiber. The spreading beam is then collimated by a lens 151 with a focal length f to become a parallel beam having a beam radius that is approximately equal to the fiber's numerical aperture, multiplied by the focal length f. The beam (represented by ray 152) strikes the grating 153 and then is split or dispersed into multiple wavelength components (represented by three rays 171, 172, and 173 for simplicity). Note that the number of dispersed wavelengths may be more or less than three, depending on how many wavelengths were present on the input fiber 161. One of the dispersed wavelength components 173 is reflected back to an output fiber by a rotating mirror 176. The wavelength spectrum of the optical power coupled to the output fiber depends on the dispersion coefficient of the grating and the focal length of the lens, as well as the core size of the output fiber 162. The smaller the focal length and the smaller the dispersion coefficient, the wider the wavelength bandwidth that is coupled to the output fiber.

The achieving of a desired wide wavelength bandwidth, coupled to the output fiber, is limited in practice by focal length. Focal lengths shorter than 1 mm are not practical for the device in shown in FIG. 3, because the mirror has to be located in the focal plane to minimize coupling losses. If the rotating mirror 176 is not located in the focal plane, the reflected light is not fully coupled to the output fiber 162, as a result of the fact that both the input fiber 161 and the output fiber 162 are located slightly off of the optical axis of the lens 151. Typical grating dimensions also limit how small the distance between the lens and the mirror can be made, making it difficult or impractical for this distance to be less than approximately 1 mm. Furthermore, a lens with such a small focal length is not geometrically compatible with other parts in the tunable filter device. For these reasons, in order to achieve a wide or broad wavelength bandwidth, a grating with a very low dispersion coefficient is desired. However, as previously indicated, gratings with low dispersion coefficients suffer from polarization dependent loss and inferior optical performance.

Figure 4:
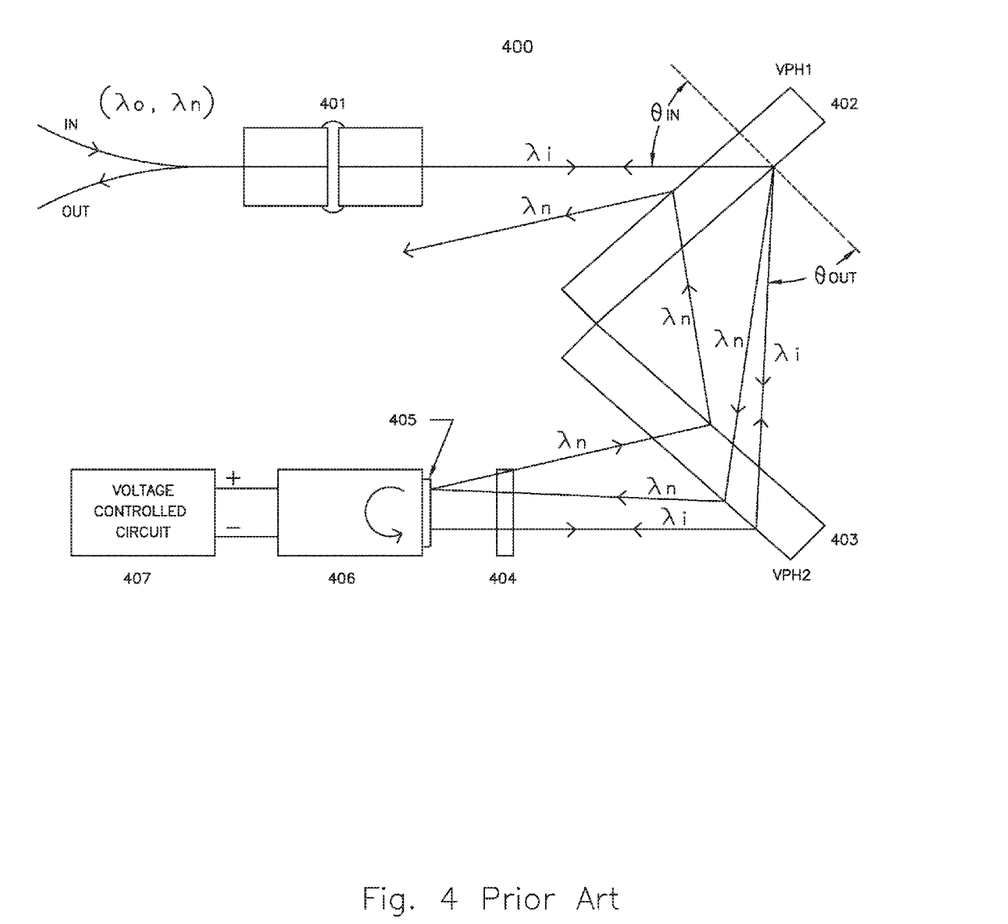
FIG. 4 shows another prior art embodiment of a tunable optical filter, using two diffraction gratings and a rotating or tilting mirror.

FIG. 4, excerpted from U.S. Pat. No. 7,899,330 (where it is FIG. 4A and where more detail can be found), shows a prior art embodiment of a tunable filter, comprising two diffraction gratings with a large angle in between. Both gratings are arranged in a Littrow configuration, which avoids multiple diffraction modes or orders, and therefore provides good efficiency. In the configuration shown in FIG. 4, the two gratings provide double the angular dispersion of a single grating, for better wavelength resolution. In this embodiment, two gratings are used to provide a filter with a narrow wavelength bandwidth or passband. Multiple wavelengths are incident on the first diffraction grating 402, at a Littrow angle, and are dispersed a first time. The multiple wavelengths then enter a second diffraction grating 403 to be dispersed a second time. Therefore the total effective dispersion angle is doubled. The angle between the two diffraction gratings (defined either by the two grating surfaces or their two respective normal lines) is typically between 60 degrees and 90 degrees, in order to be considered a Littrow configuration.

Figure 5:
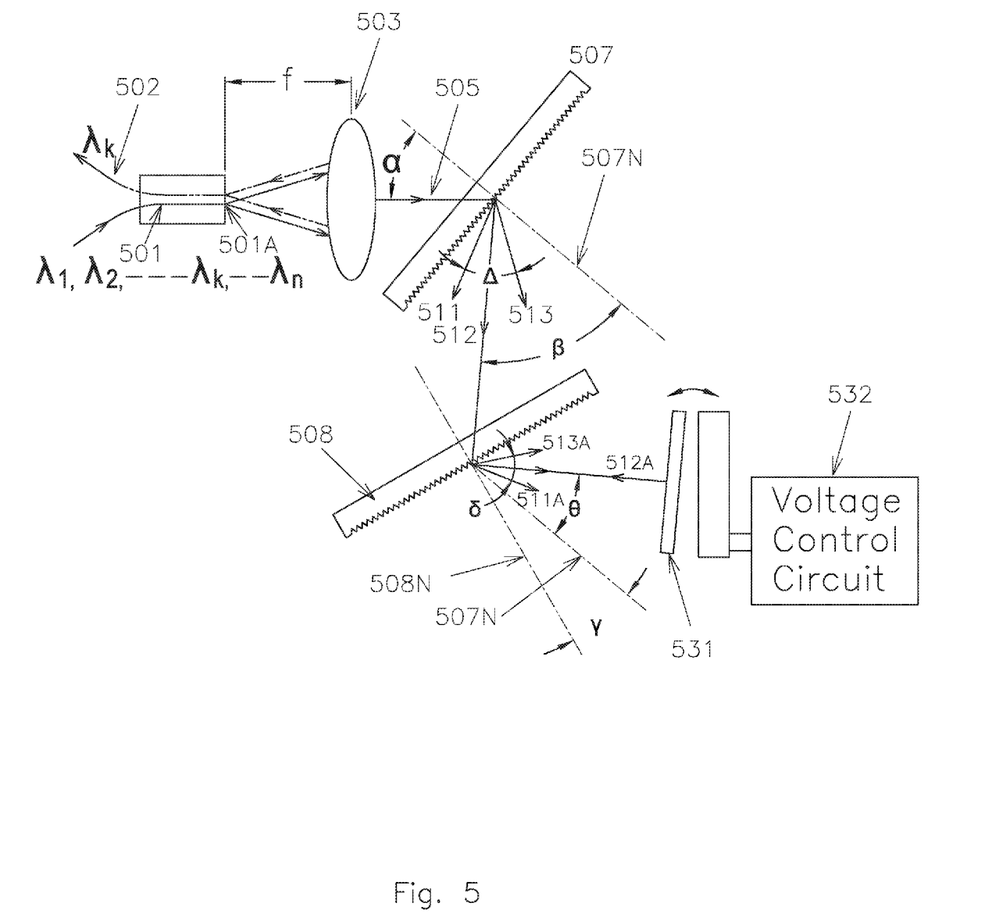
FIG. 5 shows one exemplary embodiment using two diffraction gratings with adjustable angle between the two gratings, and an adjustable mirror.

An exemplary diffraction grating system that achieves an arbitrarily low dispersion coefficient by geometrically configuring two typical diffraction elements (gratings in this example) in tandem, with a small angle in between, as indicated by FIG. 5. A signal carrying multiple wavelengths exits the input port at the fiber end face 501A of the input fiber 501 held in the ferrule, spreads out with an angle defined by the fiber's numerical aperture, and then is collimated by a lens 503 having a focal length f. Depending on the application, the incident beam of light from the input fiber can include a number of discrete bands or channels, a continuous spectrum, or some mix of these. The collimate multiple-wavelength beam, represented by ray 505, strikes the first diffraction grating 507 with an incident angle α, which differentially diffracts the light of different wavelengths. The multiple wavelength signal is then dispersed into its multiple wavelength components at different angles (represented by three rays 511, 512 and 513, respectively). The total dispersed angle (or the difference between the minimum and maximum exit angles from the first diffraction grating 507) is denoted by Δ. The dispersed rays then enter a second diffraction grating 508 and exit as rays 511A, 512A and 513A, respectively, at an angle θ with respect to the normal line 507N of the first grating 507.

The total dispersed angle of the three rays 511A, 512A, and 513A (or the difference between the minimum and maximum exit angles from the second diffraction grating 508) is denoted by S. Instead of being increased, as in the case of the grating configuration shown in FIG. 4, the dispersion angle amongst rays 511A, 512A, and 513A is now reduced to a smaller angle δ (i.e., δ is smaller than Δ), because the two diffraction gratings 507 and 508 are oriented with respect to each other with a small angle (such as less than 15 degrees). It should be noted that the groove distance d of the second grating 508 is not necessarily equal to that of the first grating 507. However, they may be of the same order of magnitude. 507N and 508N are the normal lines to the surfaces of gratings 507 and 508, respectively. The angle γ between the normal line 508N and the normal line 507N is used to define the relative orientation between the two diffraction gratings 507 and 508. 508N being oriented in the clockwise direction with respect to 507N is defined as a positive angle γ. If 508N is oriented in the counter-clockwise direction with respect to 507N, the γ is negative. Theoretically, all the wavelengths exiting from grating 508 should merge into a single ray (i.e., δ is zero) if the two diffraction gratings 507 and 508 are in parallel, and also have the same groove distance. It can therefore be understood that the angular dispersion coefficient of this two grating system can be made arbitrarily small, if a small relative angle between two diffraction gratings is chosen.

One of the rays (512A) exiting the second diffraction grating 508 is then reflected back to the output port at an output fiber 502 held in the ferrule in a reversed optical path (with respect to the incoming signal) by a rotating or tilting reflector or mirror 531 mounted on an actuator, whose rotation is controlled by a voltage control circuit 532. The actuator can rotate the mirror about a single axis, or two axes that can be perpendicular to one another. The second axis of rotation can be used to adjust the alignment of the optical path between the input and output ports, or allow a switching between multiple output ports. In addition to a switching function, a second axis can be to attenuate the optical power back to the output port, such as for attenuating the power out of an amplifier or for attenuating the signal before it is fed to a detector, if the original signal power is over the design requirement of the detector. The bandwidth or passband of the wavelength spectrum that is coupled to the output fiber 502 depends on the focal length of lens 503 and the dispersion coefficient of this two grating system, as well as the core size of the output fiber 502, as described previously. In order to achieve a wider wavelength bandwidth or passband in the output fiber 502, the dispersion coefficient of the two grating system should be made smaller. In the embodiment of FIG. 5, the beam is reflected back through the gratings 507 and 508 to the output port at the output fiber 502, being refracted a second time by each of the gratings. In other embodiments, the beam can be reflected directly back to the output port, which may be in the same ferrule as the input port or separately located.

Suppose the groove distance for the two diffraction gratings is d. The mathematical derivation for the angular dispersion coefficient is as follows:

$\sin \alpha + \sin \beta = \lambda/d$ (the grating equation for the first grating 507), $\sin(\beta-\gamma) + \sin(\theta+\gamma) = \lambda/d$ (the grating equation for the second grating 508).

Note that the incident angle for the second grating 508 is (β−γ), and the exit angle for the second grating 508 is (θ+γ). Combining the above two equations, $$\theta(\lambda,\gamma) = \sin^{-1}[\sin\alpha \cdot \cos\gamma + \sin\gamma \cdot (1 \cdot ((\lambda/d) - \sin\alpha)^2)^{1/2} \lambda/d \cdot (1 - \cos\gamma)] - \gamma.$$

The angular dispersion coefficient D is therefore:

$$D(\lambda,\gamma) = d\theta/d\lambda.$$

Figure 6:
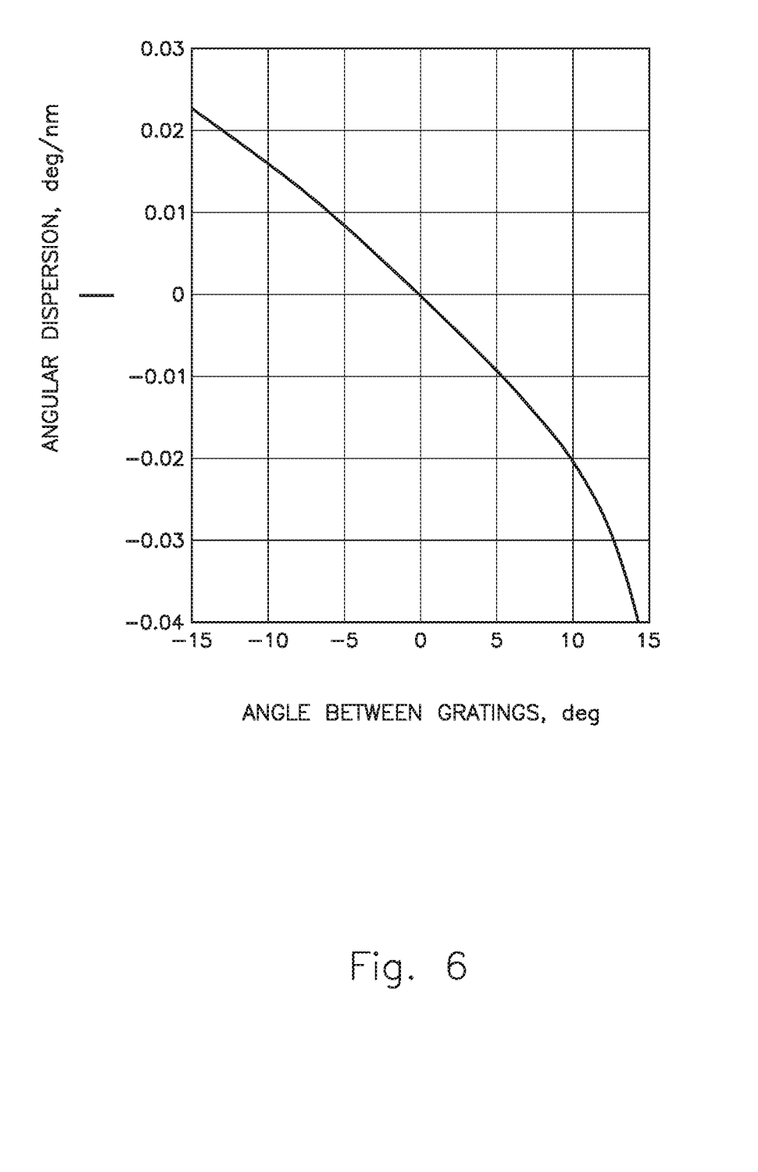
FIG. 6 shows the relationship between the angle that exists between the two diffraction gratings of the embodiment of FIG. 5, and the total angular dispersion provided by the two diffraction gratings.

FIG. 6 is a plot of the computation results for dispersion coefficient D, representing the total angular dispersion of the two-grating system (shown on the vertical axis, and expressed in degrees/nm), as a function of the angle γ between the two diffraction gratings (shown on the horizontal axis, in degrees, over a range of from −15 to +15 degrees). The computation is solved for a wavelength range around 1.55 micron (1550 nm), and assuming a groove distance for the two gratings of 1.035 micron. A Littrow configuration is assumed for the first diffraction grating.

The angle γ between the two diffraction elements is responsible for the width of the band incident upon the reflector which is then reflected back towards the output port, while the tilt of the reflector is responsible for the center of the band. The diameter of the output fiber can also affect the band's width as parts of the band not incident on the fiber's end will not be passed through the output port. Depending on the embodiment, the angle γ between the two diffraction elements can be fixed or adjustable to adjust the resultant dispersion coefficient: for example, it may be trimmable, allowing for adjustment prior to the device being shipped; it could be user adjustable, using a moving mechanism such as a lead screw to butt either the first grating or the second grating to tune the relative angle; or a voltage-controlled actuator mechanism could be included for such adjustments.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles involved and their practical application, to thereby enable others skilled in the art to best utilize the various embodiments and with various modifications as are suited to the particular use contemplated. It is intended that the scope of the invention be defined by the claims appended hereto.

It is claimed:

1. A tunable optical filter device, comprising:
   a first diffraction element oriented to differentially diffract light of different wavelengths of a beam of light incident thereupon from an input port;
   a lens located between the first diffraction element and the input port, whereby the beam of light incident on the first diffraction element from the input port is collimated
   a second diffraction element oriented to differentially diffract light of different wavelengths of the beam of light incident thereupon from the first diffraction element, wherein the second diffraction element is oriented relative to the first diffraction element such that a cumulative amount of angular dispersion from the first and second diffraction elements for portions of the beam of light incident upon the second diffraction element is less than an amount of angular dispersion from the first diffraction element for the portions of the beam of light incident upon the second diffraction element;

a reflector that reflects the portions of the beam of light incident thereupon by the second diffraction element in an optical path between the input port and an output port; and an actuator connected to change a position of the reflector so that a selected range of wavelengths of the portion of the beam of light incident upon the reflector is reflected along the optical path from the input port to the output port.

2. The tunable optical filter device of claim 1, wherein the reflector reflects the portions of the beam of light incident thereupon by the second diffraction element to be diffracted a second time by both of the first and second diffraction elements in the optical path between the input port and the output port.

3. The tunable optical filter device of claim 1, wherein the actuator changes the position of the reflector by rotating the reflector about one or more axes.

4. The tunable optical filter device of claim 3, wherein the actuator rotates the reflector about two different axes.

5. The tunable optical filter device of claim 4, wherein the actuator rotates the reflector about a first of the two different axes to select the selected range of wavelengths of the portion of the beam of light incident upon the reflector, and rotates the reflector about a second of the two different axes to align the optical path between the input port and the output port.

6. The tunable optical filter device of claim 4, wherein the actuator rotates the reflector about a first of the two different axes to select the selected range of wavelengths of the portion of the beam of light incident upon the reflector, and rotates the reflector about a second of the two different axes to provide an attenuation function.

7. The tunable optical filter device of claim 1, wherein each of the first and second diffraction elements include a diffraction grating.

8. The tunable optical filter device of claim 7, wherein the first and second diffraction elements are oriented such that an angular difference between a normal direction to the diffraction grating of the first diffraction element and a normal direction to the diffraction grating of the second diffraction element is 15 degrees or less.

9. The tunable optical filter device of claim 1, wherein the orientation of second diffraction element relative to the first diffraction element is fixed.

10. The tunable optical filter device of claim 1, wherein the orientation of second diffraction element relative to the first diffraction element is adjustable.

11. The tunable optical filter device of claim 1, further comprising:
a ferrule including the input port and the output port.

12. A method, comprising:
receiving a beam of light at an input port;
directing the beam of light to be incident on a first diffraction element, wherein directing the beam of light to be incident on the first diffraction element includes:
collimating the beam of light incident on the first diffraction element from the input port by a lens located between the first diffraction element and the input port;
differentially diffracting, by a first diffraction element, light of different wavelengths of the beam of light from the input port that is incident on the first diffraction element;
differentially diffracting, by a second diffraction element, light of different wavelengths of the beam of light from the first diffraction element that is incident on the second diffraction element, wherein the second diffraction element is oriented relative to the first diffraction element such that a cumulative amount of angular dispersion from the first and second diffraction elements for portions of the beam of light incident upon the second diffraction element is less than an amount of angular dispersion from the first diffraction element for the portions of the beam of light incident upon the second diffraction element; and
positioning a reflector so that a first selected range of wavelengths of a portion of the beam of light incident upon the reflector from the second diffraction element is reflected along an optical path from the input port to an output port.

13. The method of claim 12, further comprising:
diffracting a second time by both of the first and second diffraction elements of the portion of the beam of light incident upon the reflector along a portion the optical path between the reflector and the output port.

14. The method of claim 12, wherein the first selected range of wavelengths includes a plurality of wavelength components.

15. The method of claim 12, wherein the beam of light is received from an optical amplifier.

16. The method of claim 12, wherein positioning the reflector includes rotating the reflector about one or more axes.

17. The method of claim 16, wherein positioning the reflector includes rotating the reflector about two different axes.

18. The method of claim 17, wherein the rotation of the reflector about a first of the two different axes selects the first selected range of wavelengths of the portion of the beam of light incident upon the reflector, and the rotation of the reflector about a second of the two different axes aligns the optical path between the input port and the output port.

19. The method of claim 17, wherein the rotation the reflector about a first of the two different axes selects the first selected range of wavelengths of the portion of the beam of light incident upon the reflector, and the rotation of the reflector about a second of the two different axes provides an attenuation function.

20. The method of claim 12, wherein each of the first and second diffraction elements include a diffraction grating.

21. The method of claim 20, wherein the first and second diffraction elements are oriented such that an angular difference between a normal direction to the diffraction grating of the first diffraction element and a normal direction to the diffraction grating of the second diffraction element is 15 degrees or less.

22. The method of claim 12, wherein the orientation of second diffraction element relative to the first diffraction element is fixed.

23. The method of claim 12, further comprising:
adjusting the orientation of second diffraction element relative to the first diffraction element.

24. The method of claim 12, wherein the input port and the output port are included in a ferrule.

25. The method of claim 12, further comprising:
subsequently re-positioning the reflector so that a second selected range of wavelengths of a portion of the beam of light incident upon the reflector from the second diffraction element is reflected along an optical path from the input port to an output port.

* * * * *

UNITED STATES PATENT AND TRADEMARK OFFICE
CERTIFICATE OF CORRECTION

PATENT NO. : 9,720,250 B1  
APPLICATION NO. : 15/139694  
DATED : August 1, 2017  
INVENTOR(S) : Birman et al.

Page 1 of 1

It is certified that error appears in the above-identified patent and that said Letters Patent is hereby corrected as shown below:

In the Claims

Column 7, Line 44, (Claim 9, Line 2): After "of" and before "second" insert -- the --.

Column 7, Line 47, (Claim 10, Line 2): After "of" and before "second" insert -- the --.

Column 8, Line 38, (Claim 19, Line 1): After "rotation" and before "the" insert -- of --.

Column 8, Line 52, (Claim 22, Lines 1-2): After "of" and before "second" insert -- the --.

Column 8, Line 56, (Claim 23, Line 2): After "of" and before "second" insert -- the --.

Signed and Sealed this  
Fifteenth Day of May, 2018

Andrei Iancu  
*Director of the United States Patent and Trademark Office*